(12) United States Patent
Liang et al.

(10) Patent No.: US 10,340,617 B2
(45) Date of Patent: Jul. 2, 2019

(54) POWER MODULES AND PIN THEREOF

(71) Applicant: Delta Electronics, Inc., Taoyuan (TW)

(72) Inventors: Le Liang, Taoyuan (TW); Shouyu Hong, Taoyuan (TW); Zhenqing Zhao, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 64 days.

(21) Appl. No.: 15/168,262

(22) Filed: May 31, 2016

(65) Prior Publication Data

US 2016/0366780 A1    Dec. 15, 2016

(30) Foreign Application Priority Data

Jun. 9, 2015  (CN) .......................... 2015 1 0312461

(51) Int. Cl.
*H01R 12/58* (2011.01)
*H02M 3/04* (2006.01)
*H01R 12/52* (2011.01)

(52) U.S. Cl.
CPC .......... *H01R 12/585* (2013.01); *H01R 12/52* (2013.01); *H02M 3/04* (2013.01)

(58) Field of Classification Search
CPC .... H01R 12/585; H01R 12/52; H01R 12/727; H02M 3/04; H05K 2201/10515; H05K 7/023; H05K 5/0021; H05K 2201/043; H05K 1/144; H05K 2201/042; H05K 2201/041; H05K 2201/045; H05K 1/14; H05K 3/308
See application file for complete search history.

(56) References Cited

U.S. PATENT DOCUMENTS

| | | | | |
|---|---|---|---|---|
| 3,955,877 A | * | 5/1976 | Cobaugh .............. | H01R 12/585 439/853 |
| 4,541,034 A | * | 9/1985 | Fanning ................ | H05K 3/308 174/255 |
| 4,656,442 A | * | 4/1987 | Hayakawa ............ | H01L 25/16 174/532 |
| 4,859,188 A | * | 8/1989 | Neumann ............. | H05K 3/326 439/45 |

(Continued)

FOREIGN PATENT DOCUMENTS

| | | |
|---|---|---|
| CN | 1352869 A | 6/2002 |
| CN | 203119745 U | 8/2013 |

(Continued)

*Primary Examiner* — Steven T Sawyer
*Assistant Examiner* — Sagar Shrestha
(74) *Attorney, Agent, or Firm* — CKC & Partners Co., LLC

(57) ABSTRACT

A power module with vertically stacked structure and a pin thereof are disclosed. The power module comprises at least three circuit modules. The at least three circuit modules are a first circuit module, a second circuit module and a third circuit module. The pin is led from the first circuit module. The pin comprises: a main body, a first connection surface and a second connection surface. An upper part of the main body is electrically connected with the first circuit module. The first connection surface is provided at a middle part of the main body and electrically connected with the second circuit module. The second connection surface is provided at a terminal of the main body and electrically connected with the third circuit module.

9 Claims, 13 Drawing Sheets

(56) References Cited

U.S. PATENT DOCUMENTS

| | | | | |
|---|---|---|---|---|
| 5,344,336 A * | 9/1994 | Sampson | ............ | H01R 4/2466 |
| | | | | 439/397 |
| 5,548,486 A * | 8/1996 | Kman | .................... | H01R 12/58 |
| | | | | 361/744 |
| 5,761,050 A * | 6/1998 | Archer | ................ | H01R 12/585 |
| | | | | 361/744 |
| 5,878,483 A * | 3/1999 | Kman | .................... | H01R 12/58 |
| | | | | 29/739 |
| 5,952,716 A * | 9/1999 | Dibble | ............. | H01L 23/49811 |
| | | | | 257/697 |
| 6,019,626 A * | 2/2000 | Abe | ....................... | H01R 4/184 |
| | | | | 439/399 |
| 6,305,949 B1 * | 10/2001 | Okuyama | ............ | H01R 12/585 |
| | | | | 439/75 |
| 7,347,699 B2 * | 3/2008 | Sato | ....................... | H01R 9/096 |
| | | | | 439/66 |
| 8,618,423 B2 * | 12/2013 | Ozaki | .................... | H05K 1/182 |
| | | | | 174/262 |
| 2004/0137803 A1 * | 7/2004 | Pitzele | ................ | H05K 3/3447 |
| | | | | 439/884 |
| 2005/0189566 A1 * | 9/2005 | Matsumoto | ....... | H02M 3/33538 |
| | | | | 257/200 |
| 2006/0084291 A1 * | 4/2006 | Hironobu | ............ | H05K 3/3405 |
| | | | | 439/74 |
| 2016/0278209 A1 * | 9/2016 | Perez-Uria | ............. | H01R 4/024 |

FOREIGN PATENT DOCUMENTS

| | | |
|---|---|---|
| CN | 103943581 A | 7/2014 |
| EP | 1243166 A1 | 9/2002 |

\* cited by examiner

POWER MODULES AND PIN THEREOF

CROSS-REFERENCE TO RELATED APPLICATIONS

This non-provisional application claims priority under 35 U.S.C. § 119(a) on Patent Application No. 201510312461.7 filed in P.R. China on Jun. 9, 2015, the entire contents of which are hereby incorporated by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

FIELD OF THE INVENTION

The present invention relates to a connection component of a semiconductor device, and particularly to vertically stacked power modules and a pin thereof.

BACKGROUND

High efficiency, high power density and high reliability have always been the industry's requirements for power converters. High efficiency means reduced energy consumption, which is advantageous in energy conservation and emissions reduction, protecting the environment, and reducing cost of usage. High power density stands for small volume and light weight, which reduces cost in material, cost in transportation and space requirements, so as to reduce cost in construction. High reliability means longer service life and lower cost in maintenance.

A semiconductor device is one of key factors for efficiency of the power converter. During application, some auxiliary parts are inevitable, e.g., clamps and screws for fastening the semiconductor device, thermal pads for facilitating heat dissipation. Since discrete devices are large in number, it is tedious to install these auxiliary parts. Besides, due to the purpose of standardization for the discrete devices, utilization ratio of internal spaces is extremely low. For a typical TO-247 package in FIG. 1A-FIG. 1C as a standard discrete device package, it includes a plastic package material 10, heat dissipating sheet 20 covering the plastic package material 10, pins 40 electrically connected a chip 30 packaged in the plastic package material 10. As a result, the chip 30 occupies a principal plane (X-Y) of the plastic package material 10 by a ratio which is generally less than 40%. Integrated Power Module gradually advents to meet an increasing demand for improved performance of a power supply. A basic idea of such demand is to integrate a plurality of power semiconductor devices (usually in a form of bare chips) with small area into a module, so as to be possible to implement a high utilization ratio of space.

Reference is made to FIG. 2, it is a schematic view of a smart power module in the prior art. As shown in FIG. 2, the smart power module includes power devices 50, magnetic components 60 (e.g., a transformer, an inductor or the like), a control device 70, and passive components 80 (e.g., a resistor, a capacitor or the like), which are soldered on a substrate 90 together and form functional circuit connections and connect with an external system board by in-line pins 40.

To further improve heat dissipation capability and reliability of a high power module, a high-thermal conductive plastic package material is used in the industry to encapsulate all of the components into a block, so that heat can be conducted to a radiator 100 on the module through the plastic package material and thus be dissipated. The pins 40 can be electrically and mechanically connected with a side wall of the substrate 90 (shown in FIG. 3A and FIG. 3B). The pins 40 can also be soldered to a surface of the substrate 90 by means of a lead frame, and then led to outside by means of bending (shown in FIG. 4).

Structures of the power module described above have relatively high integration degree and power density. However, they suffer from a drawback that they occupy a large area of the external system board. In order to further reduce the occupied area of the power module, the power module can be divided into several parts such as two parts and the several parts are stacked with each other to form a module with vertically stacked structure. FIG. 5 is a schematic view of vertically stacked power modules in the art. As shown in FIG. 5, in a typical structure, the power device 50 and the magnetic components 60 are set on an upper substrate 901, while the control device 70 and some of the passive components 80 are soldered to a lower substrate 902. And the lower substrate 902 is vertically connected with the upper substrate 901 by an upper pin 401, and the lower substrate 902 is vertically connected with a system board by a lower pin 402. Though the method of connection implements stacked structures of the power modules in a vertical direction and reduces the occupied area, it still has the following drawbacks:

1) The process for producing pins and inserting pins into the substrate has a low efficiency and a high cost.

2) Pin connections between the upper and lower substrates occupy additional area on the substrate.

3) It is difficult to make a plastic package of the structure as a whole and to dissipate heat from the structure, and the structure has a poor structural reliability.

SUMMARY OF THE INVENTION

It is an object of the present invention to provide a pin for vertically stacked connections of circuit modules, the pin is led out from a first circuit module and further comprises:

a main body, an upper part of which is electrically connected with the first circuit module;

a first connection surface provided at a middle part of the main body and having an angle with the main body for being electrically connected with a second circuit module;

a second connection surface provided at a terminal of the main body and for being electrically connected with a third circuit module.

It is another object of the present invention to provide a power module, comprising at least three circuit modules which are vertically stacked, and a pin; the at least three power modules including a first circuit module, a second circuit module and a third circuit module;

the pin led from the first circuit module and further comprising:

a main body, an upper part of which is electrically connected with the first circuit module;

a first connection surface provided at a middle part of the main body and having an angle with the main body for being electrically connected with the second circuit module a second connection surface provided at a terminal of the main body and for being electrically connected with the third circuit module.

The technical effects of the present invention are as follows:

The structure of the pin of the present invention is suitable for interconnections between the vertically stacked modules (e.g., power modules or control modules) or interconnections between the vertically stacked modules and the external system board, which implement a stacked structure, and reduce the area of the external system board and increase power density.

The present invention will be described in details hereinafter by reference to the accompanying drawings and specific embodiments, but the present invention is by no means limited to these drawings and embodiments.

DESCRIPTION OF THE PREFERRED EMBODIMENTS

The principles of structures and operations of the present invention will be described in details hereinafter by reference to the accompanying drawings.

Figure 6:
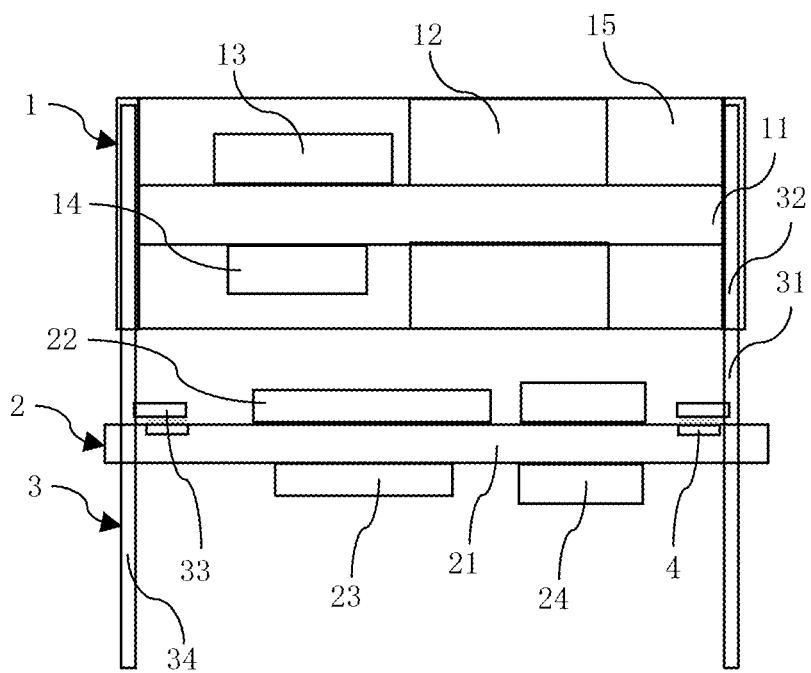
FIG. 6 is a schematic view of a power module in a first embodiment of the present invention.
Figure 7:
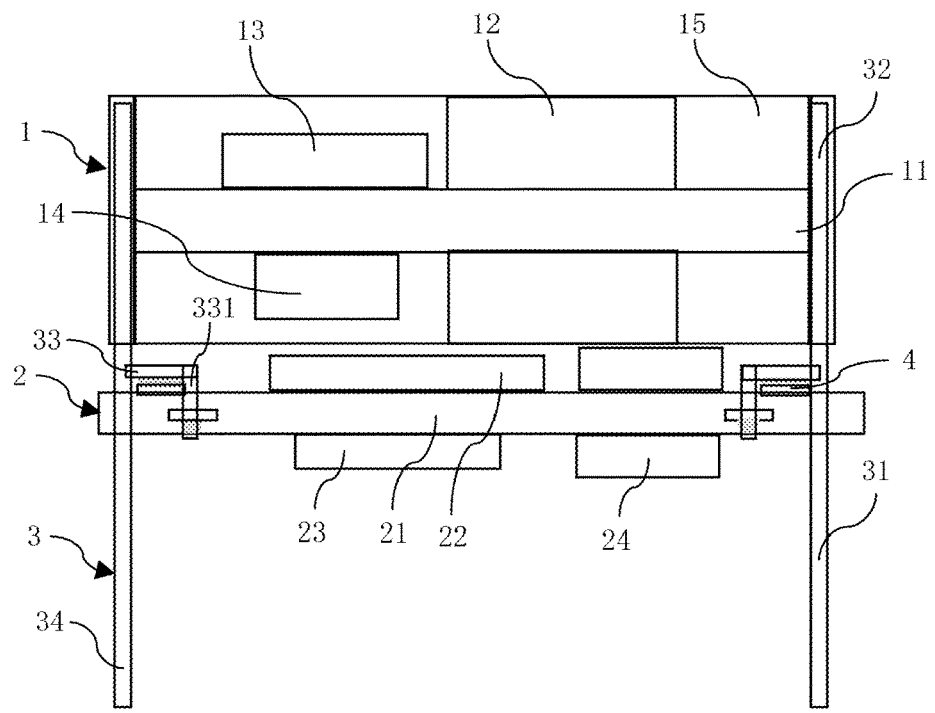
FIG. 7 is a schematic view of a power module in a second embodiment of the present invention.
Figure 8:
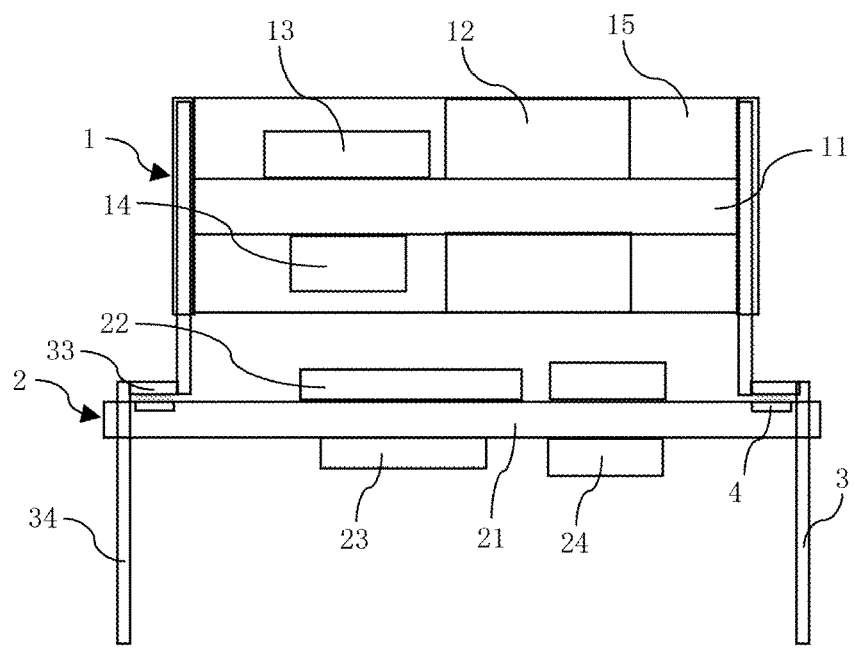
FIG. 8 is a schematic view of a power module in a third embodiment of the present invention.
Figure 9A:
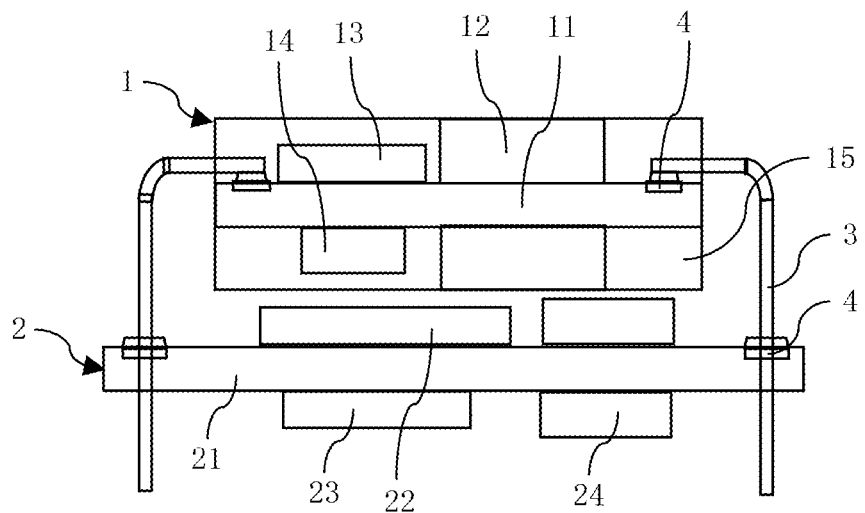
FIG. 9A is a schematic view of a power module in a fourth embodiment of the present invention.
Figure 9B:
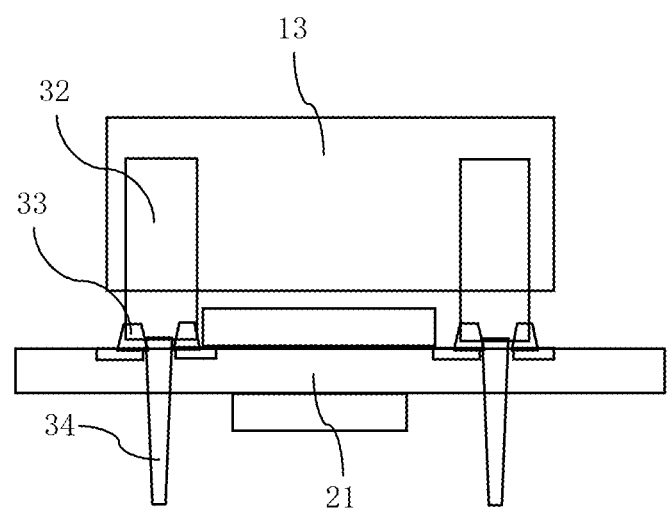
FIG. 9B is a side view of FIG. 9A.

Reference is made to FIG. 6-FIG. 9B, FIG. 6 is a schematic view of a power module in a first embodiment of the present invention, FIG. 7 is a schematic view of a power module in a second embodiment of the present invention, FIG. 8 is a schematic view of a power module in a third embodiment of the present invention, FIG. 9A is a schematic view of a power module in a fourth embodiment of the present invention, and FIG. 9B is a side view of FIG. 9A. In the present invention, a power module includes at least three circuit modules which are vertically stacked and connected. As shown in FIG. 6, the at least three circuit modules include a first circuit module 1, a second circuit module 2, and a third circuit module (not shown) in which at least one is a power circuit module, and these circuit modules are electrically connected by a pin 3. Generally, the third circuit module is an external system board. The so-called power circuit module includes at least one power switch for power conversion. The second circuit module can be a control circuit module for controlling the power circuit module.

The first circuit module 1 includes a substrate 11 and a power converter circuit thereon. The power converter circuit generally includes magnetic components 12 (e.g. a transformer, an inductor or the like), a power device 13 or the like, which are soldered on the substrate 11 together and electrically connected with one another. The power converter circuit is connected with the second circuit module 2 and the third circuit module by the pin 3. The second circuit module 2 includes a substrate 21 and a power converter circuit thereon. The power converter circuit generally includes a controller 22, a power device 23, and passive components 80 (e.g. a resistor, a capacitor or the like). The substrate 21 is provided with a through hole 211, and a bonding pad 4 provided at a position adjacent to the through hole 211. When the pin 3 passes through the through hole 211, the pin 3 is connected with the bonding pad 4 so that the second circuit module 2 is connected with the first circuit module 1 and the third circuit module. The substrate 11 of the first circuit module and the substrate 21 of the second circuit module can be generally printed circuit boards, but they are not limited to the printed circuit boards here. Connection relationships and operation principles of the power converter circuits and the components on the first circuit module 1, the second circuit module 2 and the third circuit module are well known in the art of power converters, which isn't repeated here for simplicity. Only the structure of the pin of the present invention is described in detail hereinafter.

Figure 1A:
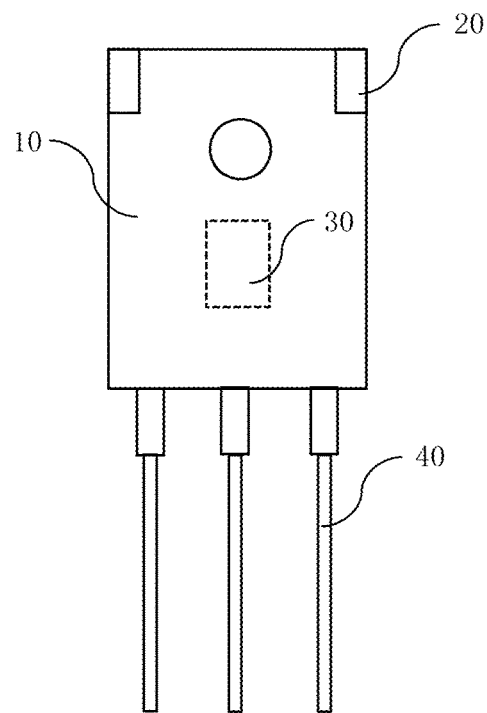
FIG. 1A is a schematic view of a TO-247 package in the art.
Figure 1B:
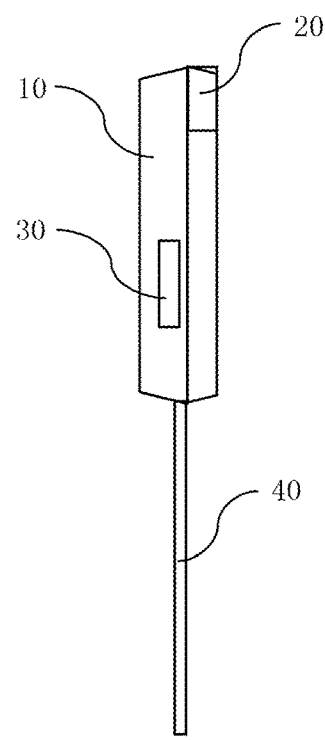
FIG. 1B is a side view of FIG. 1A.
Figure 1C:
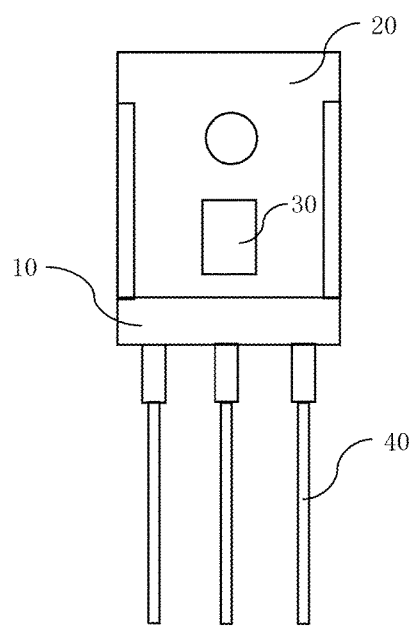
FIG. 1C is a rear view of FIG. 1A.
Figure 2:
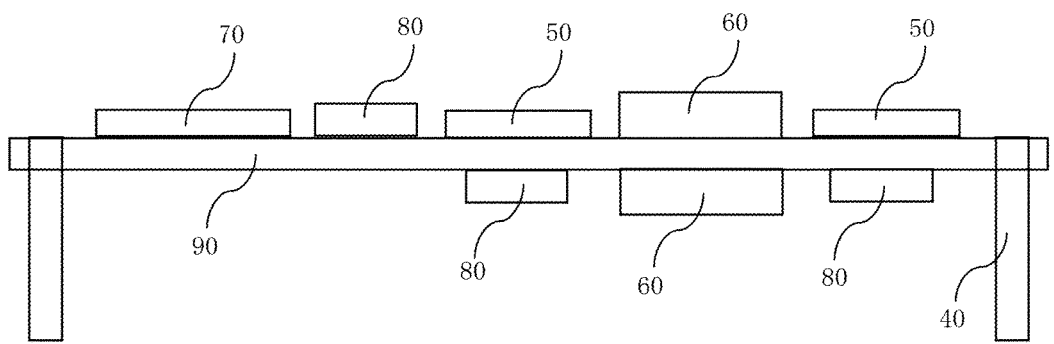
FIG. 2 is a schematic view of a smart power module in the art.
Figure 3A:
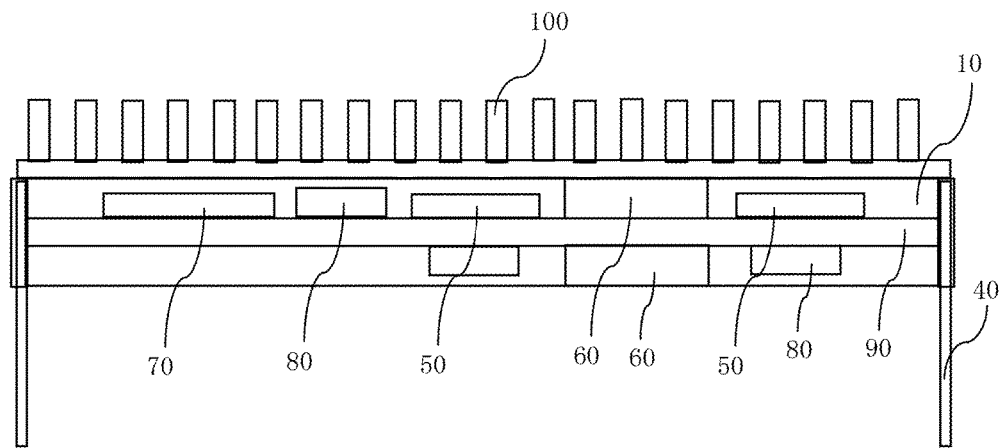
FIG. 3A is a schematic view of a plastic package power module in the art.
Figure 3B:
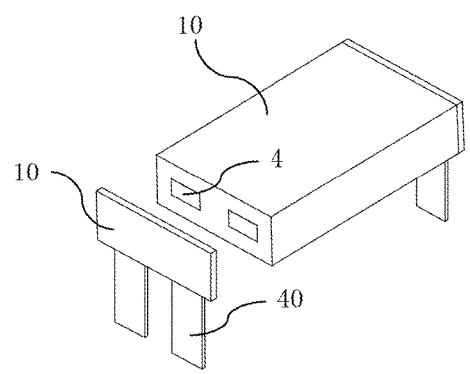
FIG. 3B is a schematic view of electrical connections of the pin in FIG. 3A.
Figure 4:
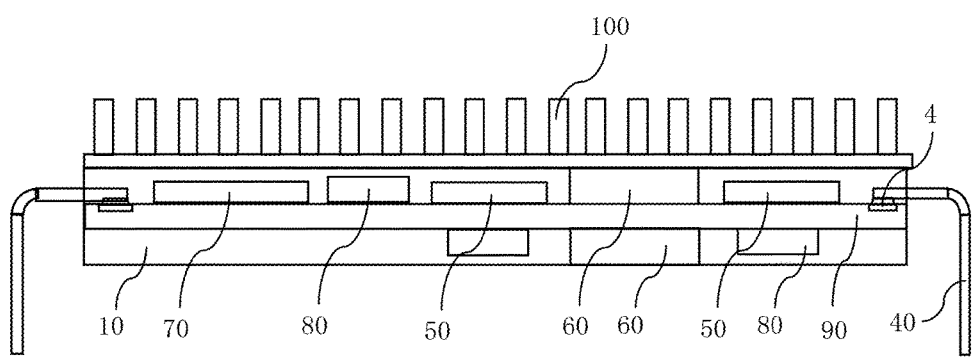
FIG. 4 is a schematic view of another plastic package power module in the art.
Figure 5:
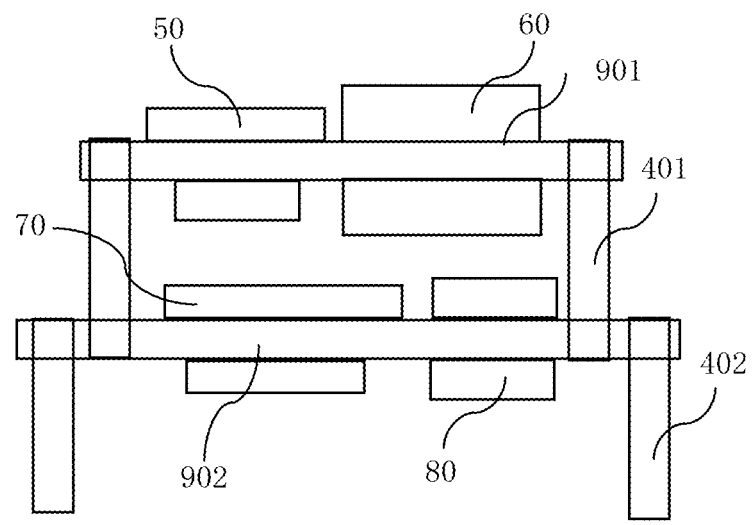
FIG. 5 is a schematic view of vertically stacked power modules in the art.
Figure 10:
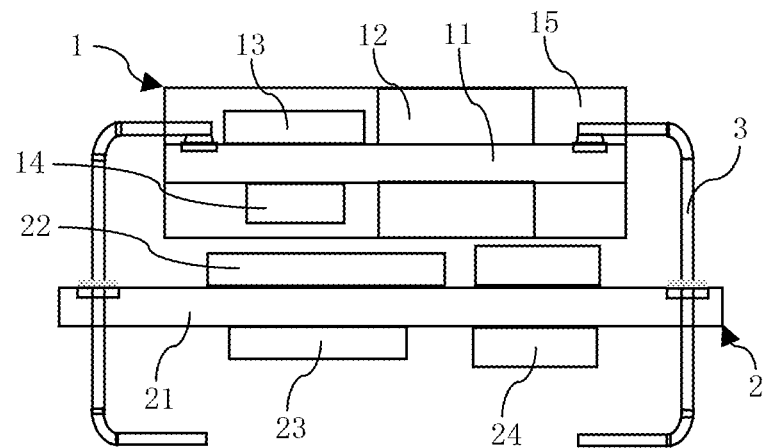
FIG. 10 is a schematic view of connections with an external system board in an embodiment of the present invention.
Figure 11:
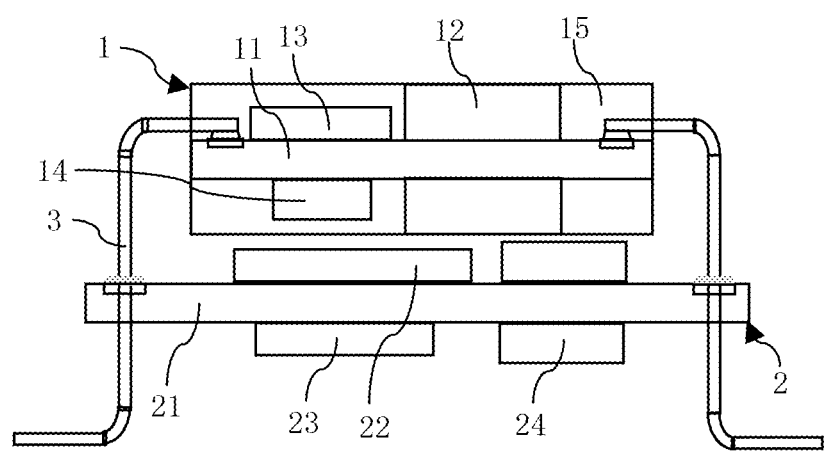
FIG. 11 is a schematic view of connections with an external system board in another embodiment of the present invention.

Reference is made to FIG. 10 and FIG. 11, FIG. 10 is a schematic view of connections between the first circuit module and the second circuit module in an embodiment of the present invention, and FIG. 11 is a schematic view of connections between the first circuit module and the second circuit module in another embodiment of the present invention, in which the external system board is not shown. The pin 3 for interconnecting the first circuit module 1 and the second circuit module 2 can be implemented in two ways. One way is that the bonding pad 4 is formed on a side wall of the substrate, and the pin terminal 32 is soldered on the bonding pad 4 to form the electrical connection (as shown in FIG. 3B). The other way is that the pin 3 is formed in a form of a lead frame, and the lead frame is soldered to an upper surface or a lower surface of the substrate, which is bent to form the pin 3 after shaping (as shown in FIG. 4). As shown in FIGS. 10 and 11, the pin 3 is led from the first circuit module 1, and a part of the pin 3 to which the external system board is connected can be bent into a shape of J or gull-wing. The pin 3 is a SMD type pin so that the pin 3 can be formed into a surface mounting device which can be soldered to the external system board by a surface mount technology (SMT) process.

Figure 12A:
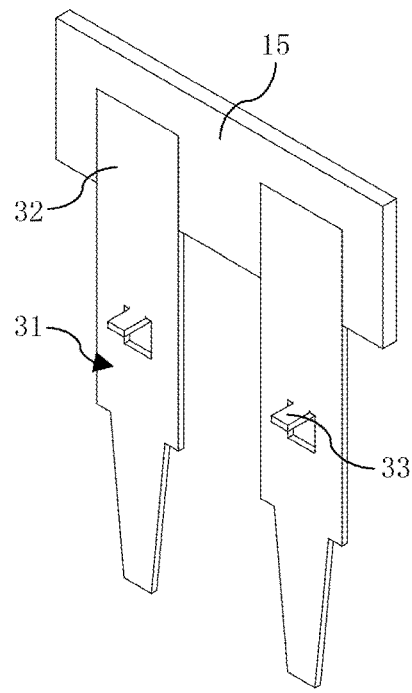
FIG. 12A is a schematic view of a pin in the first embodiment of the present invention.
Figure 12B:
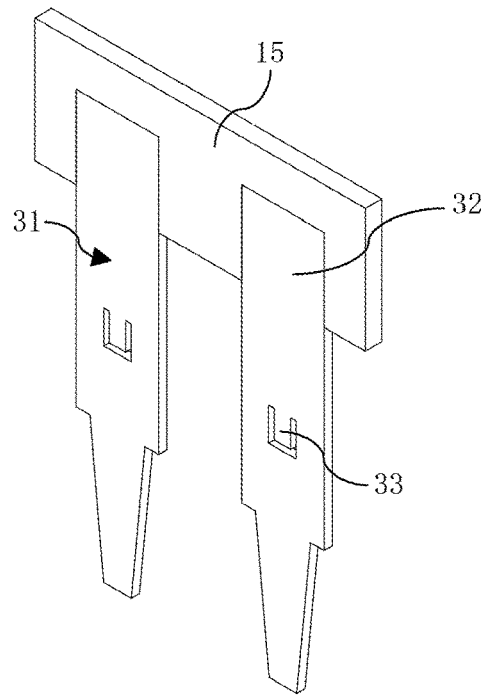
FIG. 12B is a schematic view of FIG. 12A before bending.
Figure 12C:
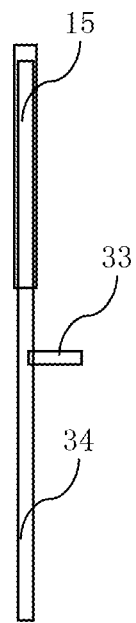
FIG. 12C is a side view of FIG. 12A.

Reference is made to FIG. 12A-FIG. 12C, FIG. 12A is a schematic view of the pin in the first embodiment of the present invention, and FIG. 12B is a schematic view of a structure of FIG. 12A before bending, and FIG. 12C is a side view of FIG. 12A. The pin 3 for vertically stacked connections of circuit modules of the present invention includes a main body 31 and the pin terminal 32 provided at an upper part of the main body 31, and the pin terminal 32 is electrically connected with the first circuit module 1. The pin 3 further includes a first connection surface 33 and a second connection surface 34.

Figure 13:
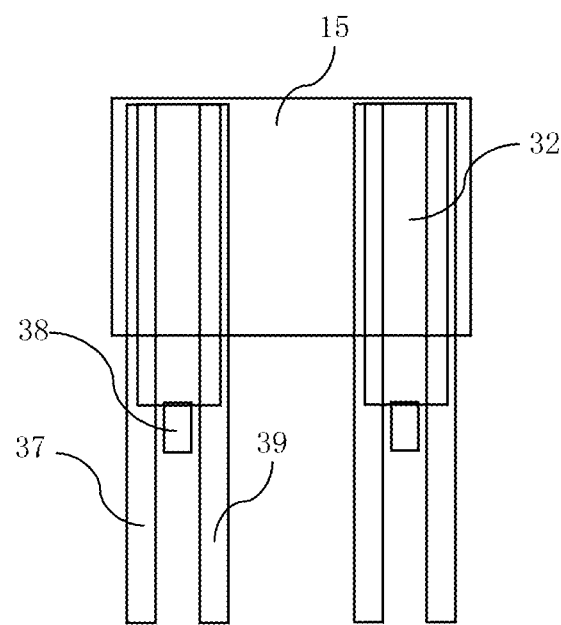
FIG. 13 is a schematic view of a pin in the second embodiment of the present invention (before bending)
Figure 15A:
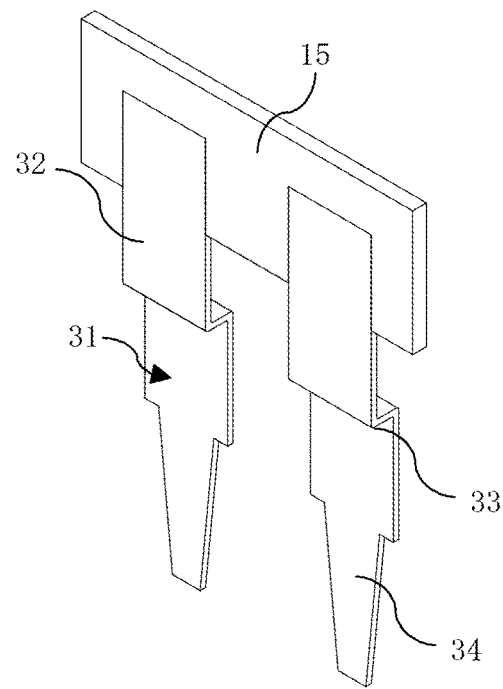
FIG. 15A is a schematic view of a pin in the fourth embodiment of the present invention.
Figure 15B:
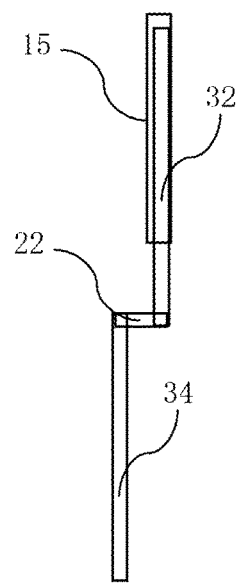
FIG. 15B is a side view of FIG. 15A.

The first connection surface 33 is provided at a middle part of the main body 31, and forms an angle with the main body 31, and is used for electrically connecting with the second circuit module 2. The first connection surface 33 limits a position of the second circuit module 2 in a first direction which is parallel with the substrate of the second circuit module 2, and limits a position of the second circuit module 2 in a second direction which is perpendicular to the first direction. The angle between the first connection surface 33 and the main body 31 is larger than 0 degree and less than or equal to 180 degrees. Preferably, the angle is 90 degrees. In the present embodiment, a U shaped groove is provided at a center of the main body 31, and the first connection surface 33 is engaged with the U shaped groove to form an I shape. The first connection surface 33 is bent at a position where it is joined with the main body to form the angle between the first connection surface 33 and the main body 31. In other embodiments, as shown in FIG. 13, the U shaped groove in the main body is of open type, and the main body is divided into three branches at a joint between the first connection surface 38 and the main body. The three branches include a first branch 37, a first connection surface 38, and a second branch 39. Ends of the first branch 37 and the second branch 39 can act as a second connection surface. In the embodiments shown in FIG. 12A-FIG. 12C, the first connection surface 33, the second connection surface 34, and the main body 31 are shaped in one piece. The second connection surface 34 is provided at a terminal of the main body 31, and is used for electrically connecting with the third circuit module. The second connection surface 34 can have a triangular shape or a trapezoidal shape. In other embodiments shown in FIG. 15A-FIG. 15B, the first connection surface 33, the second connection surface 34, and the main body 31 are shaped in one piece, and the first connection surface 33 is a stepped surface and perpendicular to all of the remaining parts of the main body 31. The substrate 21 of the second circuit module 2 is connected with the first circuit module 1 and the third circuit module by the first connection surface 33 respectively. At the same time, the first connection surface 33 further facilitates a role for supporting the first circuit module 1. The second connection surface 34 has a trapezoidal shape and can be inserted into the third circuit module. The pin 3 is made of metal material, e.g., copper, nickel, aluminum, or alloys thereof. The pin 3 can be connected with the substrate 21 of the second circuit module 2, wherein the first connection surface 33 can be connected with a bonding pad on the substrate 21 of the second circuit module 2, and can limit the position of the substrate 21 of the second circuit module 2 by means of the main body 31 in two dimensions or directions, i.e., a horizontal direction and a vertical direction. Reference is made to FIG. 7, a difference from the above embodiment is that a metal sheet as the first connection surface 33 is extended and bent to form a bending surface 331. The bending surface 331 can function as another connection surface and can be inserted into the through hole 211 which is formed in advance in the substrate 21 of the second circuit module 2. In this way, a better function of position limitation and structure reinforcement can be implemented. Besides, a part of the bending surface 331 which extends from the substrate 21 of the second circuit module 2 can be soldered to the underlying bonding pad 4, so as to form an additional electric connection.

Figure 14:
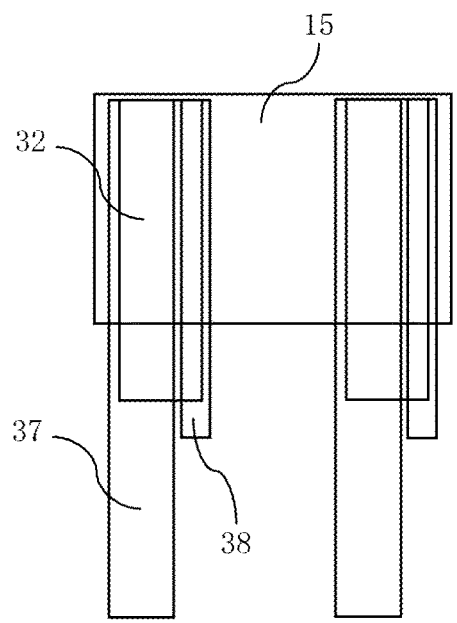
FIG. 14 is a schematic view of a pin in the third embodiment of the present invention (before bending)
Figure 16:
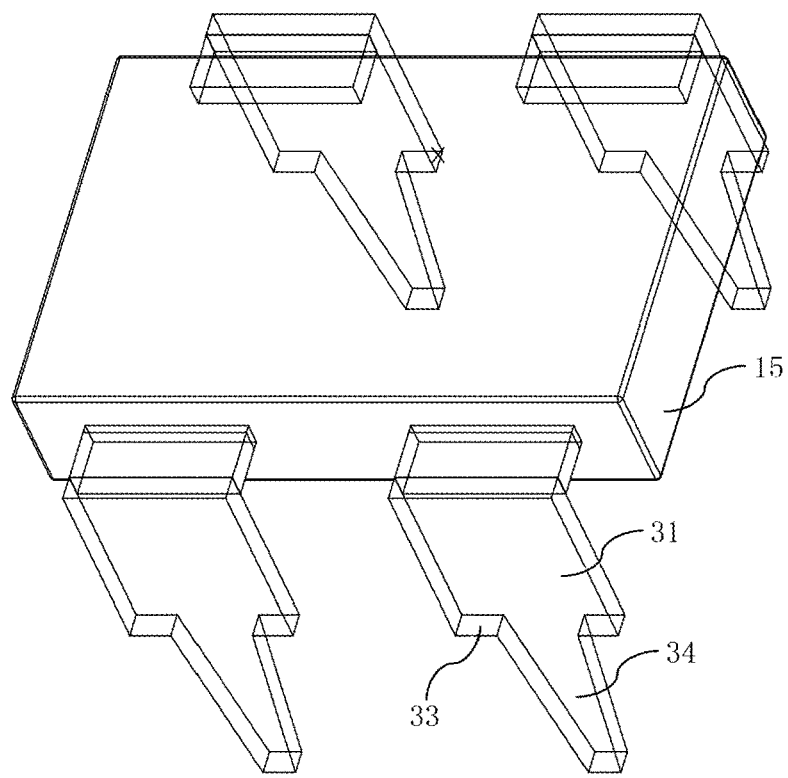
FIG. 16 is a schematic view of a pin in a fifth embodiment of the present invention.

Reference is made to FIG. 14, it is a schematic view of a pin in the third embodiment of the present invention (before bending). In this embodiment, the first connection surface 33 is not bent. In this embodiment, the first connection surface 33 has an I shape, and a lower part of the main body 31 includes the first branch 37 and the second branch 38 which are parallel with each other and have a parallel pitch therebetween. The second branch 38 is bent at a position where it is joined with the main body 31 to form an angle between the second branch 38 and the main body 31. In this way, the second branch 38 can not only function as the bonding pad connection between the first connection surface 33 and the substrate 21 of the second circuit module 2, but also support the first circuit module 1, to a certain extent. A hole is formed in the substrate 21 of the second circuit module 2, so that the first branch 37 passes through the hole to connect with the third circuit module. Reference is made to FIG. 16, it is a schematic view of a pin structure in the fifth embodiment of the present invention. In the present embodiment, the first connection surface 33, the second connection surface 34 and the main body 31 are shaped in one piece. The first connection surfaces 33 at the middle part of the main body 31 are two inwardly stepped surfaces which are provided at the two sides of the main body 31 and concave inwardly to each other. Two sides of the middle part of the main body 31 are concaved inwardly and extended to form a relatively narrow second connection surface 34 at the lower part of the main body 31. Accordingly, the substrate 21 of the second circuit module 2 is provided with a hole through which a trapezoidal or triangular second connection surface 34 can pass. A bonding pad for the second circuit module 2 is provided at a position which is adjacent to the hole and at the position where the substrate is contacted with the first connection surface 33, so that the second circuit module 2 is connected with the third circuit module through the first connection surface 33. Besides, in the present embodiment, the first connection surface 33 can support the first circuit module 1 to a certain extent.

Figure 19:
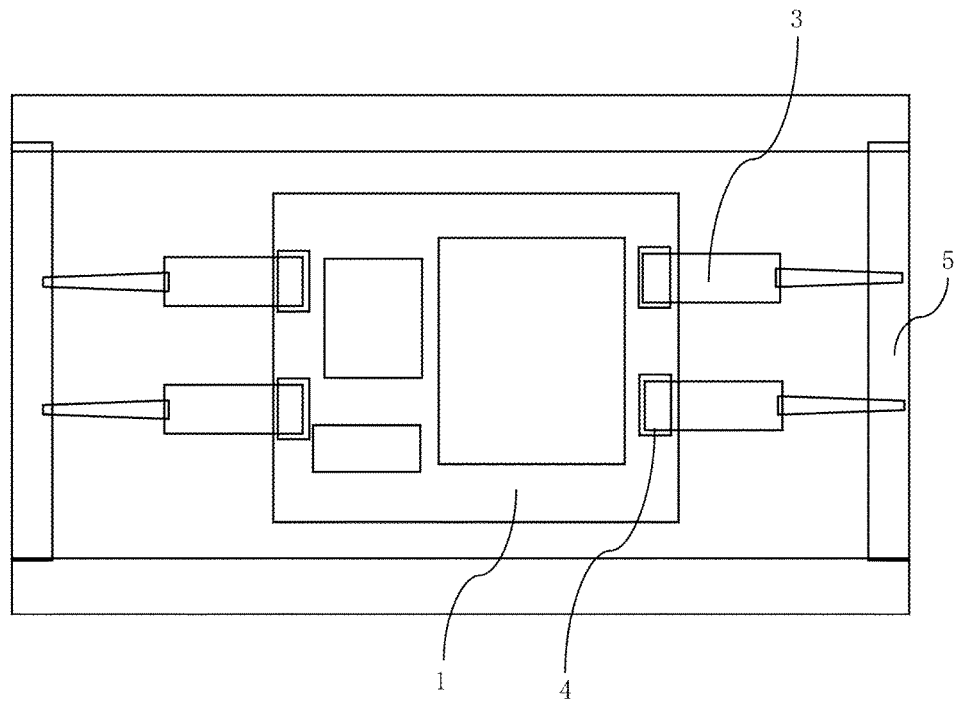
FIG. 19-FIG. 20 are schematic views of processes of pin connection in the fifth embodiment of the present invention.
Figure 20:
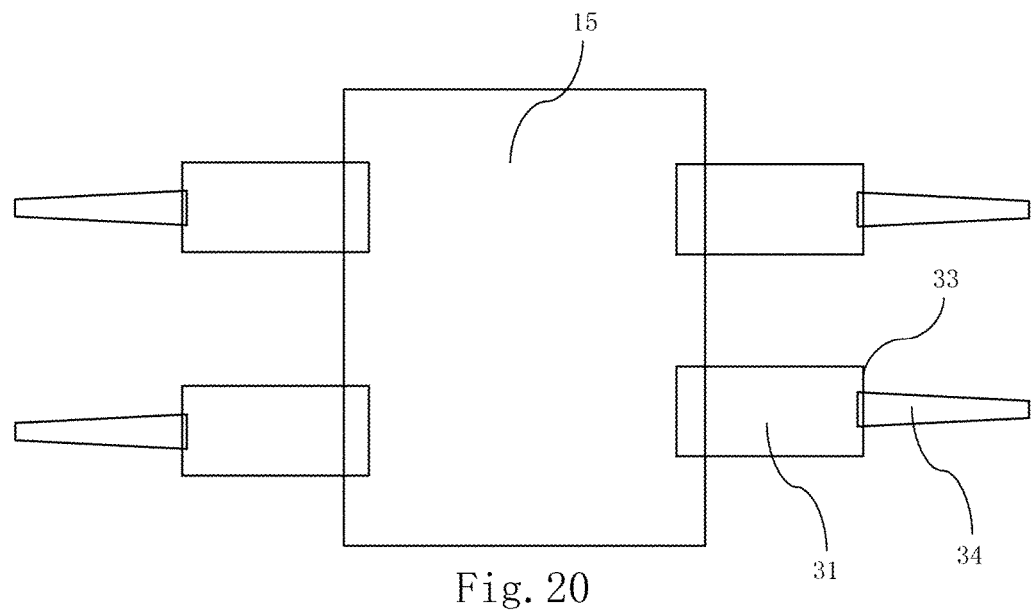

The pin in FIG. 16 can be produced by an embodiment shown in FIG. 19. As shown in FIG. 19, the pin 3 is made into a form of a lead frame 5 in advance, and is soldered to the bonding pad 4 on an upper or lower surface of the first circuit module 1. Then, the internal circuit board and the pin 3 are packaged with a plastic package material 15 by injection molding (as shown in FIG. 20). Finally, the pin 3 is bent, and the bent pin 3 is shown as the pin in FIG. 16. The first connection surface 33 which is soldered to the substrate 21 of the second circuit module 2 is at the middle part of the main body 31 in the pin 3. The substrate 21 of the second circuit module 2 can be limited in position or can be positioned by means of soldering connection between the first connection surface 33 and the bonding pad on the substrate 21 of the second circuit module 2. In this embodiment, increasing the thickness at the middle part of the pin facilitates increasing the area of the first connection surface 33. After the pin 3 of the plastic packaged first circuit module is bent, it can be soldered to the substrate 21 of the second circuit module 2 by surface mounting process in a manner similar to the above embodiments (as shown in FIG. 9A and FIG. 9B).

The above embodiments of the present invention disclose a structure of the pin as follows. The pin includes a main body, and an upper part of the main body is connected with a first circuit module. A first connection surface is provided at a middle part of the main body and is connected with a second circuit module. And a second connection surface is provided at a terminal of the main body and is connected with a third circuit module. Generally, the third circuit module is an external system board which has a relatively large substrate area. Specific structures of the first connection surface have been described in these embodiments, e.g., a separate body separated from the main body, an I shape structure, a short branch, a stepped surface, or inwardly concave faces at two sides of the middle part of the main body. These specific structures illustrate how to implement connection between the pin and the second circuit module. However, embodiments of the first connection surface of the pin are not limited to embodiments as set forth above, and corresponding and possible alternations or modifications should fall within the protection scope of the structure of the pin in the present invention.

Figure 17:
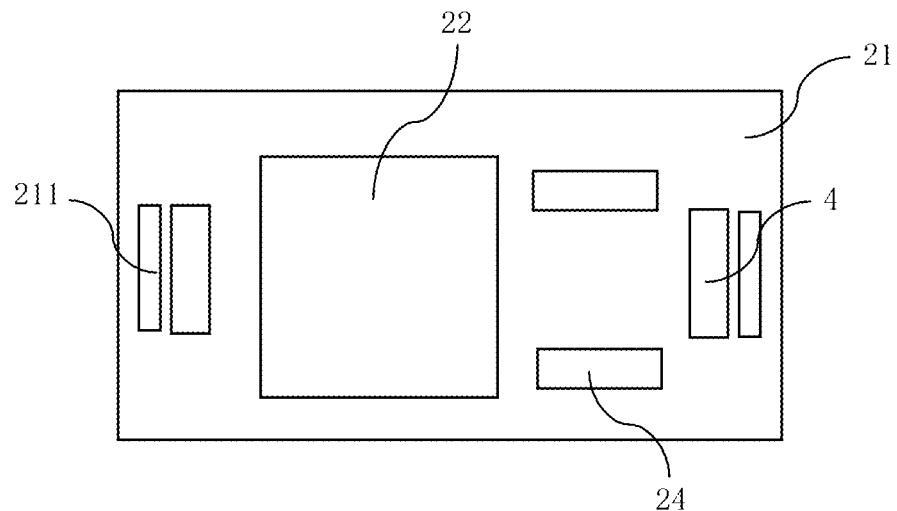
FIG. 17 is a schematic view of a substrate in an embodiment of the present invention.
Figure 18:
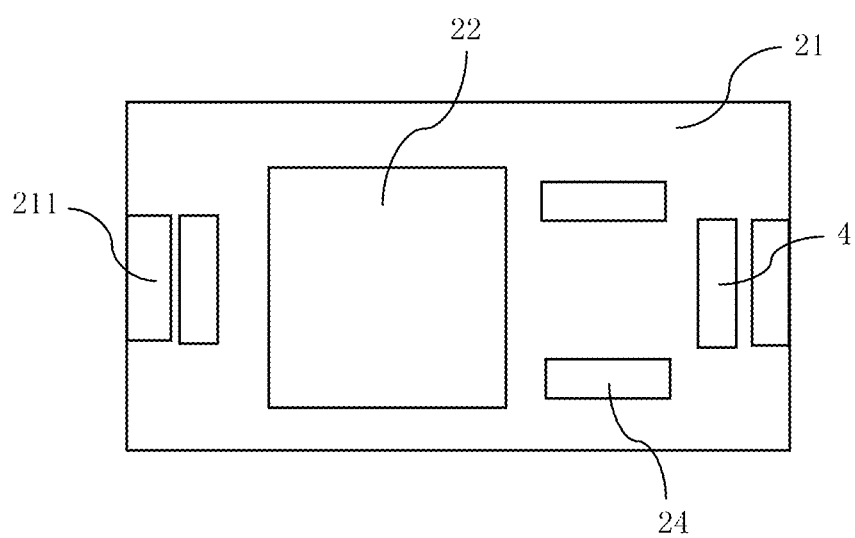
FIG. 18 is a schematic view of a substrate in another embodiment of the present invention.

A through hole and a bonding pad which are provided on the substrate of the second circuit module correspond to the first connection surface at the middle part of the pin. Reference is made to FIGS. 17-18 for some specific embodiments. FIG. 17 is a schematic view of a substrate of the second circuit module in an embodiment of the present invention, and FIG. 18 is a schematic view of a substrate of the second circuit module in another embodiment of the present invention. Here, the through hole 211 of the substrate 21 of the second circuit module 2 through which the pin 3 passes can be hollowed-out or have a half-opened shape, and the bonding pad 4 can be provided on the substrate surface adjacent to the through hole 211 (as shown in FIG. 17) so as to be soldered to the first connection surface 33 of the pin 3. The first connection surface 33 of the pin 3 plays two roles here. One role is electrically connecting the substrate 21 of the second circuit module 2, and the other is supporting and limiting connection between a two-layers structure of the upper first circuit module 1 and the lower second circuit module 2. It is noted that, among the above embodiments, the position of the through hole 211 and the bonding pad on the substrate 21 of the second circuit module 2 as described above corresponds to an embodiment of the pin in which the first connection surface 33 is a stepped surface or has an I shape. In an embodiment corresponding to the embodiment of the pin shown in FIG. 16, the bonding pad on the substrate 21 of the second circuit module 2 will be provided at two sides of the through hole 211 and electrically connected with the first connection surface 33 which are provided on inwardly concave faces at two sides of the middle part of the main body 31 of the pin. Therefore, the first connection surface of the pin 3, the through hole 211 and the bonding pad on the substrate 21 of the second circuit module 2 should be modified in position in different embodiments accordingly.

In the present invention, the power module should be a power module for converting power supply, and for example a DC/DC converter circuit, an AC/DC, DC/AC, or AC/AC converter circuit, or a PFC circuit, and so on.

The invention may also have various kinds of other embodiments, and those skilled in the art can make various kinds of corresponding modifications and variations to the invention without departing from the spirit and essence of the invention. These corresponding modifications and variations should belong to the scope sought for protection of the attached claims of the invention.

What is claimed is:

1. A pin for vertically stacked connections of circuit modules, the pin being led out from a first circuit module, wherein the pin comprises:
   a main body, an upper part of which is electrically connected with the first circuit module;
   a first connection surface provided at a middle part of the main body and electrically connected with a second circuit module;
   a second connection surface provided at a terminal of the main body and electrically connected with a third circuit module;
   wherein at least one of the first circuit module, the second circuit module and the third circuit module is a power circuit module, and the power circuit module comprises at least one power switch for power supply conversion,
   wherein the first connection surface is contacted with and connected with a bonding pad provided on an upper surface of the second circuit module, when the second connection surface passes through a through hole provided in the second circuit module from the upper side,
   wherein at least one connection portion between the pin and the circuit modules are packaged with a plastic package material,
   wherein the pin are formed by cutting and bending a lead frame, and
   wherein the first connection surface, the second connection surface and the main body are shaped in one piece, a U shaped groove is provided at a center of the main body, and the first connection surface is engaged with the U shaped groove to form an I shape, and the first connection surface is bent at a position where it is joined with the main body so as to form an angle between the first connection surface and the main body.

2. The pin according to claim 1, wherein the angle between the first connection surface and the main body is larger than 0 degree and less than or equal to 180 degrees.

3. The pin according to claim 2, wherein the angle is 90 degrees.

4. The pin according to claim 1, wherein the second connection surface has a triangular shape or a trapezoidal shape.

5. A power module, comprising at least three circuit modules which are vertically stacked, and a pin,
   the three circuit modules including a first circuit module, a second circuit module and a third circuit module, wherein at least one of the first circuit module, the second circuit module and the third circuit module is a power circuit module, and the power circuit module comprises at least one power switch for power supply conversion;
   the pin led out from the first circuit module and further comprising:

a main body, an upper part of which is electrically connected with the first circuit module;

a first connection surface provided at a middle part of the main body and electrically connected with the second circuit module;

a second connection surface provided at a terminal of the main body and electrically connected with the third circuit module, wherein the first connection surface is contacted with and connected with a bonding pad provided on an upper surface of the second circuit module, when the second connection surface passes through a through hole provided in the second circuit module from the upper side, wherein at least one connection portion between the pin and the circuit modules are packaged with a plastic package material, wherein the pin are formed by cutting and bending a lead frame, and wherein the first connection surface, the second connection surface and the main body are shaped in one piece, a U shaped groove is provided at a center of the main body, and the first connection surface is engaged with the U shaped groove to form an I shape, and the first connection surface is bent at a position where it is joined with the main body so as to form an angle between the first connection surface and the main body.

6. The power module according to claim 5, wherein the angle between the first connection surface and the main body is larger than 0 degree and less than or equal to 180 degrees.

7. The power module according to claim 5, wherein the first connection surface is a stepped surface which is perpendicular to the remaining parts of the main body.

8. The power module according to claim 5, wherein the second circuit module comprises a substrate and a power converter circuit thereon, and the substrate is provided with the through hole corresponding to the main body and the bonding pad for connecting with the first connection surface.

9. The power module according to claim 8, wherein the through hole is adjacent to the bonding pad.

* * * * *